W. F. GROENE AND W. G. HOELSCHER.
BASE AND CHIP PAN FOR MACHINE TOOLS.
APPLICATION FILED JAN. 2, 1920.

1,363,969.

Patented Dec. 28, 1920.

INVENTORS
William F. Groene
BY William G. Hoelscher

Walter Murray ATTORNEY

UNITED STATES PATENT OFFICE.

WILLIAM F. GROENE AND WILLIAM G. HOELSCHER, OF CINCINNATI, OHIO, ASSIGNORS TO THE R. K. LE BLOND MACHINE TOOL COMPANY, OF CINCINNATI, OHIO, A CORPORATION OF OHIO.

BASE AND CHIP-PAN FOR MACHINE-TOOLS.

1,363,969.

Specification of Letters Patent.     Patented Dec. 28, 1920.

Application filed January 2, 1920.   Serial No. 348,795.

*To all whom it may concern:*

Be it known that we, WILLIAM F. GROENE and WILLIAM G. HOELSCHER, citizens of the United States of America, and residents of Cincinnati, in the county of Hamilton and State of Ohio, have invented new and useful Improvements in Bases and Chip-Pans for Machine-Tools, of which the following is a specification.

Our invention relates to a means for catching the chips that fall from the cutting tool of machine tools, particularly from the cutting tools of lathes.

The object of our invention is a pan for catching chips which will direct them to a point at which they may be collected by a helper, without interfering with the work of the operator of the machine tool.

In the accompanying drawing:—

Figure 1:
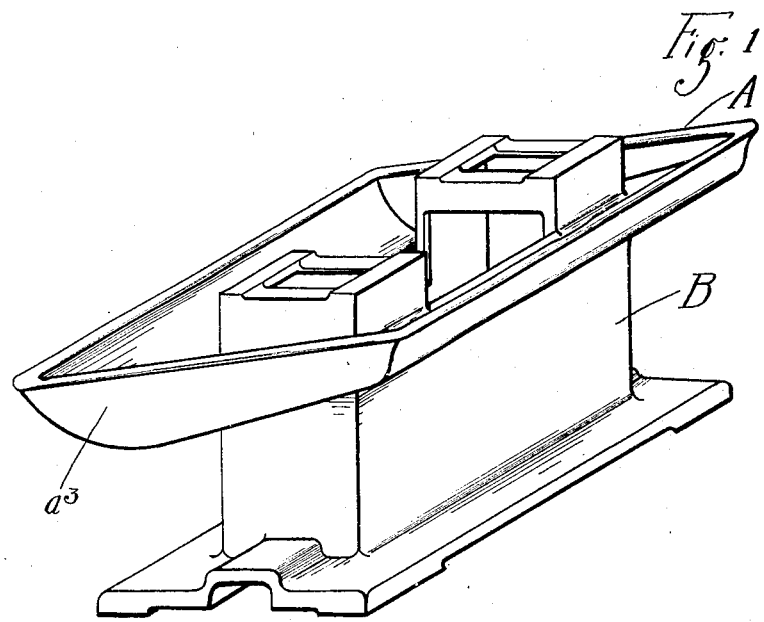
Figure 1, is a perspective view of a base and chip pan embodying our invention.
Figure 2:
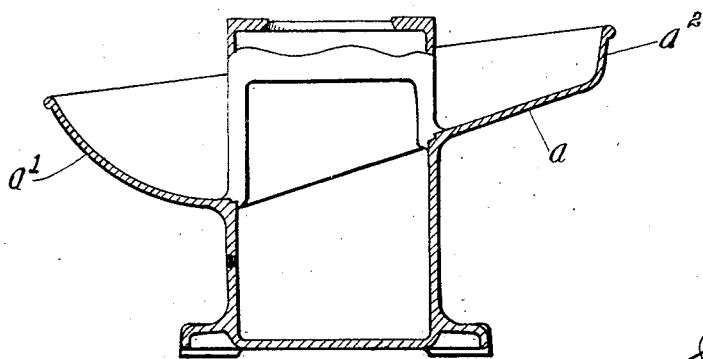
Fig. 2, is a view partly in section and partly in elevation of the same.

The pan A entirely surrounds the base B and is formed preferably integral therewith. The bottom $a$ of the pan is inclined downwardly from the front of the machine toward the rear thereof. The rear side $a'$ of the pan is of greater depth than the front side $a^2$. The ends $a^3$ taper from the rear to the front.

In operation of the machine, chips falling into the pan will tend to accumulate at the rear, because of the inclined bottom of the pan, and may be readily collected by a helper without interfering with the operator, who is engaged at the front of the machine.

Having thus described our invention, what we claim is:—

1. The combination of a base of a machine tool, a pan mounted upon and surrounding the base and having a bottom inclined downwardly from the front toward the rear of the base.

2. The combination of an integral base and pan of a machine tool, the pan surrounding the base and having a bottom inclined downwardly from the front toward the rear.

3. The combination of a pan and a base of a machine tool, the pan being mounted upon and surrounding the base, having a bottom inclined downwardly from the front toward the rear and having its rear side of greater depth than the front side and having ends tapering from the rear side to the front side.

In witness whereof we have hereunto subscribed our names this 30th day of December, 1919.

WILLIAM F. GROENE.
WM. G. HOELSCHER.